United States Patent

Voit et al.

[11] Patent Number: 5,368,312
[45] Date of Patent: Nov. 29, 1994

[54] ARRANGEMENT FOR THE SEALING-OFF OF METALLIC CYLINDRICAL BODIES

[75] Inventors: Arno Voit, Hausham; Walter Stich, Miesbach, both of Germany

[73] Assignee: Deutsche Aerospace AG, Munich, Germany

[21] Appl. No.: 99,347

[22] Filed: Jul. 30, 1993

[30] Foreign Application Priority Data

Jul. 30, 1992 [DE] Germany .............................. 4225142

[51] Int. Cl.⁵ ................................................ F16J 15/00
[52] U.S. Cl. ..................................... 277/26; 277/138; 277/153
[58] Field of Search ............... 277/26, 28, 101, 138, 277/152, 153, 205, 227, 235 R

[56] References Cited

U.S. PATENT DOCUMENTS

| | | |
|---|---|---|
| 3,109,293 | 11/1963 | Williams et al. ................. 277/26 |
| 3,188,098 | 6/1965 | Skinner . | 
| 3,630,533 | 12/1971 | Butler ............................... 277/26 |
| 4,240,643 | 12/1980 | Becker et al. . | 
| 4,706,970 | 11/1987 | Ramirez . | 
| 5,171,024 | 12/1992 | Janocko ............................ 277/26 |
| 5,217,232 | 6/1993 | Makhobey ........................ 277/26 |

FOREIGN PATENT DOCUMENTS

3326811A1 2/1985 Germany .
4102371A1 8/1991 Germany .

OTHER PUBLICATIONS

"Anwendung von Formgedächtnis-Legierungen in der Technik", by Dr. P. Tautzenberger und Prof. Dr. D. Stöckel, Pforzheim, Neue Werkstofftechnologien, Carl Hanser Verlag München 1986, pp. 703–708.
"Formgedächtnislegierungen für moderne Problemlösungen", by Von Klaus Halter et al., Technische Rundschau, pp. 30–39. May 1991.

Primary Examiner—William A. Cuchlinski, Jr.
Assistant Examiner—Daniel G. DePumpo
Attorney, Agent, or Firm—Evenson, McKeown, Edwards & Lenahan

[57] ABSTRACT

A sealing arrangement for the sealing-off of metallic cylindrical bodies is disclosed, particularly for shafts in cryogenic valves which are surrounded by an essentially ring-shaped sealing device which cannot be glued to metal. The sealing device is surrounded by a ring which is arranged concentrically with respect to the shaft, consists of a metal alloy with shape memory characteristics and with a one-way characteristic and the interior shape of which is adapted to the exterior shape of the sealing device and which contracts when the transition temperature is exceeded.

3 Claims, 2 Drawing Sheets

ARRANGEMENT FOR THE SEALING-OFF OF METALLIC CYLINDRICAL BODIES

BACKGROUND AND SUMMARY OF THE INVENTION

The present invention relates to an arrangement for the sealing-off of metallic cylindrical bodies, particularly shafts in cryogenic valves, the shaft being arranged such that it can be slid coaxially in the axial direction in a cylindrical housing, and being surrounded by an essentially ring-shaped sealing device made of a material that cannot be glued to metal.

In the case of cryogenic valves, as they are required particularly for space missions, the requirement exists that sealing devices, particularly plastic—metal connections, must be stable in the temperature range of $20K < T < 350K$ for many years; that is, that no leakages must occur which negatively influence the sealing effect. Such leakages may occur particularly as the result of different shrinkages of metal and plastic in the case of major temperature changes. A plastic sealing device which is placed in a press fit on a shaft to be sealed off and which consists of a material such as pure teflon or Vespel, that is, materials which cannot be glued to metals, depends in its sealing effect on the ambient temperature; that is, that in the case of different amounts of shrinkage of plastic and metal an only insufficient sealing is achieved at lower temperatures.

For several years, metal alloys have been known which have shape memory characteristics and which have the capability of abruptly changing their dimensions in the case of a predetermined temperature. Several of these alloys have a one-way characteristic; that is, when the transition temperature is exceeded, they maintain the resulting changed size or dimension. In contrast, other alloys have a reversible, that is, a two-way characteristic, in which case, when there is an exceeding of or falling below the transition temperature, a defined dimensional change is obtained (*Zeitschrift fur wirtschaftliche Fertigung* (*Journal for Economical Manufacturing*), Volume 12, 1986, Pages 703, et. seq.).

The firm Raychem Corporation in Menlo Park, Calif., U.S.A., offers electric couplers (Brochure M1928, H 50772, July 1984) in which a sleeve consisting of a metal alloy with shape memory characteristics and interior sealing cutting edges surrounds the end pieces of two abutting pipes that are to be connected and consist, for example, of steel, in which case the holding force which is generated by the shrinking of the sleeve considerably exceeds that of a welding.

It is an object of the present invention to provide an arrangement for the sealing-off of shafts in cryogenic valves which ensures a sealing effect over a period of several years which is independent of temperatures, while the metal alloys with shape memory characteristics are used which are known per se, so that within the temperature range of from 20K to approximately 350K, a high prestress is maintained within the arrangement and a sliding-off of the sealing device during axial movements of the shaft is reliably avoided.

Based on an arrangement of the initially specified type, it is suggested for achieving this object that the sealing device be surrounded by a ring which is arranged concentrically with respect to the shaft which is slidable coaxially in a cylindrical housing, consists of a metal alloy with shape memory characteristics and with a one-way characteristic and whose interior shape is adapted to the exterior shape of the sealing device and whose crystal structure is arranged such that, when the transition temperature is exceeded, the ring contracts radially and as a result connects the sealing device in a force-locking and form-locking manner with the housing.

Advantageously, the ring-shaped sealing device is provided with a groove which extends coaxially with respect to its opening and in which a spring is inserted which spreads the groove radially. In this case, the spring may consist of a band which is arranged in the groove bottom and which is provided with spring shackles arranged on both sides which extend at a distance from one another along the groove walls.

Preferably, the ring surrounding the sealing device has an essentially L-shaped cross-section, in which case that interior wall of the ring which rests on the exterior wall of the sealing device in parallel to the exterior wall of the shaft is provided with several sealing cutting edges.

The arrangement of the housing may have a flange which surrounds the shaft concentrically and which has a collar which projects concentrically upward to the shaft and which engages into a fitted recess in the sealing device.

The exterior wall of the collar is advantageously provided with at least one sealing cutting edge which, in an axial sectional view, is arranged between two adjacent sealing cutting edges on the interior wall of the ring.

Instead of the arrangement of the housing having a flange, the ring and sealing device may also be connected directly with a housing outer wall.

The arrangement according to the invention has a simple construction and offers a constant sealing effect over the whole temperature range of $20K < T < 350K$ while the desired high prestress is maintained. It also offers the advantage of cost-effective manufacturing and can be arranged with few manipulations on the shaft that is to be sealed off correspondingly. A heating above the transition temperature of the material with the shape memory characteristics and with the one-way characteristic has the effect that the ring contracts abruptly, and the sealing device made of plastic which otherwise cannot be connected with metal and which consists, for example, of pure Teflon, of PCTFE, FEP, PEEK, Vespel or other high-temperature thermoplastics, is pressed with enormous force on the exterior wall of the cylindrical housing.

Other objects, advantages and novel features of the present invention will become apparent from the following detailed description of the invention when considered in conjunction with the accompanying drawings.

DETAILED DESCRIPTION OF THE DRAWINGS

Figure 1:
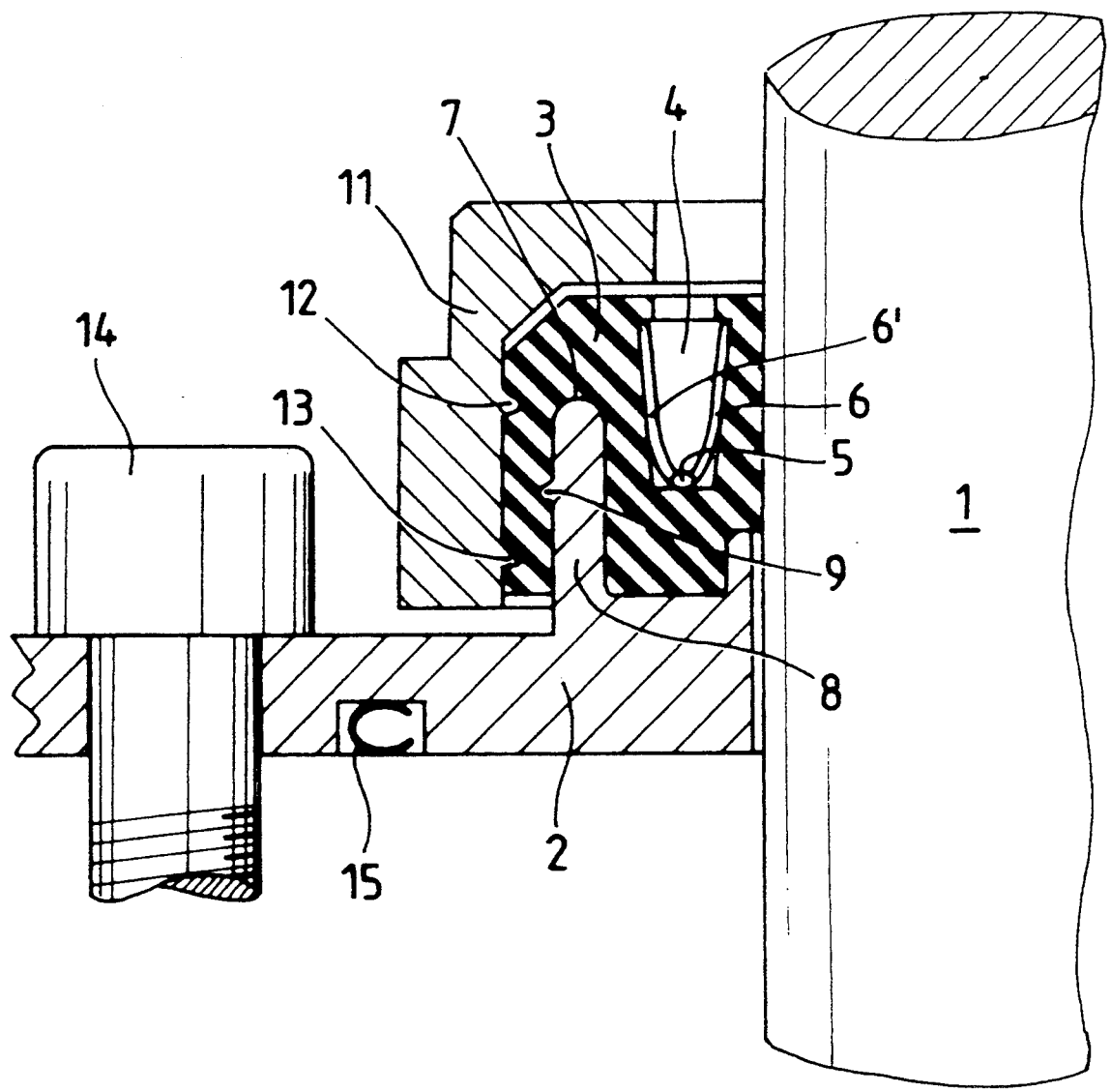
FIG. 1 is a sectional view of an arrangement according to the invention in connection with a flange.

In the figures, in which identical parts are provided with the same reference numbers, reference number 1 indicates a shaft to be sealed off, that is, a longitudinally slidably arranged shaft in a cryogenic valve. In this case, the shaft 1 is arranged in a cylindrical housing which is arranged coaxially with respect to it and is surrounded by an essentially ring-shaped sealing device 3 which consists of a plastic material which cannot be glued to metal. Advantageously, the sealing device 3 is provided with a groove 5 which is arranged concentrically with respect to the shaft 1 and in which a spring is inserted which spreads the groove radially. This spring may consist of a spring band 5 which is arranged in the bottom of the groove and from which spring shackles 6, 6' extend, which on both sides extend at a distance from one another and which result in a considerable stiffening of the sealing device 3 with a simultaneous radial stressing of the wall portions adjacent to the groove.

The sealing device 3 is also provided with a recess 7 which, offset to the groove 5, also surrounds the shaft 1 concentrically and in which a collar 8 of a housing flange 2 engages with which the arrangement may be connected. On its exterior side facing away from the shaft 1, the collar 8 of the flange 2 has at least one sealing cutting edge 9 which cuts into the sealing device 3 when the sealing device 3 is deformed.

Reference number 11 indicates a ring made of a metal alloy with shape memory characteristics and with a one-way characteristic whose interior shape is adapted to the exterior shape of the sealing device 3 and which surrounds this sealing device, in which case the crystal structure of the ring 11 is arranged in such a manner that, when the transition temperature is exceeded, the ring 11 will contract radially and will as a result connect the sealing device 3 with the housing in a force-locking and form-locking manner.

As illustrated by the two figures, the ring 11 has an essentially L-shaped cross-section, in which case the longitudinal support of the L extends in parallel to the axis of the shaft 1. In this case, the interior wall of the ring 11 which rests against the exterior wall of the sealing device 3 is provided with several sealing cutting edges 12, 13 which, when the ring 11 shrinks, penetrate into the softer material of the sealing device 3 consisting of plastic and fix it. A further fixing takes place by the penetrating of the sealing cutting edge 9 on the exterior wall of the collar 8 of the flange 2.

Figure 2:
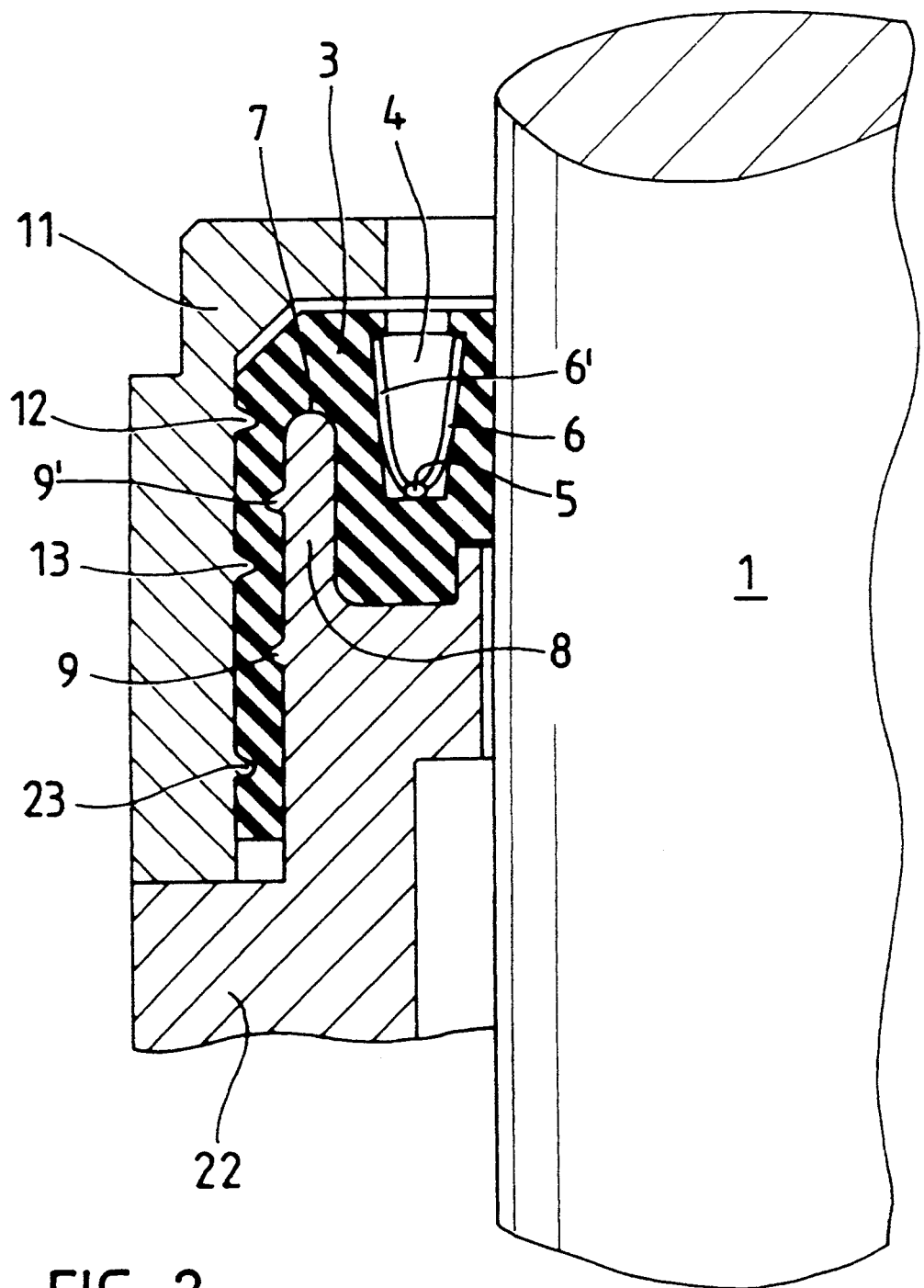
FIG. 2 is a sectional view of an arrangement according to the invention in connection with a cylinder jacket surface.

In the case of the embodiment illustrated in FIG. 1, a screw is shown which has the reference number 14 and a C-ring is shown as another sealing device which has the reference number 15. In the case of the embodiment illustrated in FIG. 2, the arrangement interacts with a cylinder jacket surface so that the screw 14 and the C-ring 15 may be eliminated. In this case, a housing 22 is provided without a flange like flange 2 of FIG. 1.

Thus, in the two embodiments, the desired sealing effect in the indicated large temperature range is achieved by the fact that a ring 11 consisting of a metal alloy with shape memory characteristics and with a one-way characteristic is caused to undergo a very severe shrinkage by means of an appropriate heating to, for example, 80° C. By means of suitable layouts of the wall thicknesses and a suitable selection of the material of the carrier body, that is, while taking into account the pertaining temperature coefficients, it is ensured in this case that the desired high prestress is maintained over the whole given temperature range, whereby the sealing cutting edges are pressed firmly into the sealing device consisting of plastic.

In principle, the sealing-off arrangement may also be implemented by means of the known shrinkage press fit; for example, by means of an exterior ring consisting of aluminum which surrounds the interior plastic ring. However, the temperature difference required for this purpose between the heating of the aluminum ring and the cooling of the interior ring exceeds the so-called glass transition temperature of the sealing material so that an only insufficient sealing effect is achieved.

The considerable shrinkage forces which act on the sealing device and originate from the ring 11 prevent a sliding-off of the sealing device during axial movements of the shaft 1. This sealing effect is maintained for many years so that long transport paths and long storage periods of cryogenic valves which are provided with the arrangement according to the invention do not cause any impairment of the sealing effect. If, after a successful use in space or after a storage of several years, the sealing device should have to be replaced, the ring 11 made of the metal alloy should be destroyed by being twisted off or sawing apart, while the flange bodies and the housing remain undamaged, however, and may be used again.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An arrangement for the sealing-off of metallic cylindrical bodies, particularly shafts in cryogenic valves, the shaft being arranged such that it can be skid coaxially in the axial direction in a cylindrical housing and being surrounded by an essentially ring-shaped sealing device made of a material that cannot be glued to metal, wherein the sealing device is surrounded by a ring which is arranged concentrically with respect to the shaft and is made of a metal alloy with shape memory characteristics, the interior shape of the ring being adapted to the exterior shape of the sealing device and the crystal structure of the ring being arranged such that, when a transition temperature is exceeded, the ring contracts radially and, as a result, connects the sealing device with the cylindrical housing in a force-locking and form-locking manner, wherein the ring which surrounds the sealing device has an essentially L-shaped cross-section, and wherein an interior wall of the ring which rests against an exterior wall of the sealing device in parallel to an exterior wall of the shaft is provided with several sealing cutting edges, wherein the cylindrical housing has a flange which surrounds the shaft concentrically and which has a collar which projects upward concentrically with respect to the shaft and engages in an adapted recess in the sealing device, and wherein an exterior wall of the collar is provided with at least one sealing cutting edge which, in an axial sectional view, is arranged between two adjacent sealing cutting edges on an interior wall of the ring.

2. An arrangement according to claim 1, wherein the ring-shaped sealing device has a groove which extends coaxially to its opening and in which, under certain circumstances, a spring is inserted which spreads the groove radially.

3. An arrangement according to claim 2, wherein the spring consists of a spring band which is arranged in the bottom of the groove and which is provided with spring shackles which are arranged on both sides and extend at a distance from one another along the groove walls.

* * * * *